United States Patent
Bober et al.

(10) Patent No.: US 7,630,526 B2
(45) Date of Patent: Dec. 8, 2009

(54) METHOD AND APPARATUS FOR FACE DESCRIPTION AND RECOGNITION

(75) Inventors: Miroslaw Bober, Surrey (GB); Krzysztof Kucharski, Warsaw (PL); Wladyslaw Skarbek, Warsaw (PL)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 435 days.

(21) Appl. No.: 11/129,396

(22) Filed: May 16, 2005

(65) Prior Publication Data
US 2006/0034517 A1    Feb. 16, 2006

(30) Foreign Application Priority Data
May 17, 2004    (GB)    ................................. 0410973.2

(51) Int. Cl.
G06K 9/00 (2006.01)
G06K 9/46 (2006.01)
G06K 9/66 (2006.01)
G06K 9/62 (2006.01)

(52) U.S. Cl. ........................ 382/118; 382/190; 382/156

(58) Field of Classification Search ................. 382/118, 382/190, 209, 156
See application file for complete search history.

(56) References Cited

U.S. PATENT DOCUMENTS

| | | | | |
|---|---|---|---|---|
| 5,598,510 A * | 1/1997 | Castelaz | ...................... | 706/25 |
| 6,343,267 B1 * | 1/2002 | Kuhn et al. | .................. | 704/222 |
| 6,766,299 B1 * | 7/2004 | Bellomo et al. | ............. | 704/276 |
| 6,782,126 B2 * | 8/2004 | Rao et al. | ................... | 382/164 |
| 6,801,661 B1 * | 10/2004 | Sotak et al. | ................. | 382/203 |
| 6,961,703 B1 * | 11/2005 | Higgins et al. | .............. | 704/249 |
| 7,400,783 B2 * | 7/2008 | Sheu | ........................... | 382/294 |
| 2003/0086593 A1 * | 5/2003 | Liu et al. | ..................... | 382/118 |
| 2003/0113017 A1 * | 6/2003 | Thomas et al. | .............. | 382/181 |
| 2003/0165260 A1 | 9/2003 | Kim et al. | | |
| 2003/0169908 A1 * | 9/2003 | Kim et al. | .................... | 382/118 |
| 2003/0202686 A1 * | 10/2003 | Rowe | ......................... | 382/118 |
| 2003/0215115 A1 | 11/2003 | Kim et al. | | |
| 2003/0231806 A1 * | 12/2003 | Troyanker | ................... | 382/305 |
| 2004/0015495 A1 | 1/2004 | Kim et al. | | |

(Continued)

FOREIGN PATENT DOCUMENTS

EP    1411459 A1    4/2004

(Continued)

OTHER PUBLICATIONS

Zhou et al. "Comparing Discriminating Transformations and SVM for Learning During Multimedia Retrieval" MM Sep. 30, 2001-Oct. 1, 2001 ACM, pp. 1-10.*

(Continued)

*Primary Examiner*—Andrew W Johns
*Assistant Examiner*—Mia M Thomas
(74) *Attorney, Agent, or Firm*—Birch, Stewart, Kolasch & Birch, LLP.

(57) ABSTRACT

A face recognition method, apparatus and system uses an architecture comprising multiple dual Linear Discriminant Analysis (LDA) transformations applied to coefficients of a frequency-based transformation applied to the facial image and its components.

This new method significantly reduces extraction complexity compared to prior art and also offers increased robustness to face pose, illumination conditions and other factors, thus improving the recognition or authentication performance.

21 Claims, 6 Drawing Sheets

U.S. PATENT DOCUMENTS

| | | | |
|---|---|---|---|
| 2004/0017932 A1* | 1/2004 | Yang | 382/118 |
| 2004/0062424 A1* | 4/2004 | Mariani et al. | 382/118 |
| 2004/0073543 A1 | 4/2004 | Kim et al. | |
| 2004/0170305 A1* | 9/2004 | Kim et al. | 382/118 |
| 2005/0105779 A1* | 5/2005 | Kamei | 382/118 |
| 2005/0201595 A1* | 9/2005 | Kamei | 382/118 |
| 2007/0022063 A1* | 1/2007 | Lightowler | 706/15 |

FOREIGN PATENT DOCUMENTS

| | | |
|---|---|---|
| EP | 1416425 A1 | 5/2004 |
| EP | 1343107 A3 | 3/2005 |
| EP | 1522962 A1 | 4/2005 |
| WO | WO-03/083774 A1 | 10/2003 |
| WO | WO-03/088131 A2 | 10/2003 |
| WO | WO-2004/008391 A1 | 1/2004 |

OTHER PUBLICATIONS

"Information Technology—Multimedia Content Description Interface," ISO/IEC 15938-8/PDAM1.

"Information Technology—Multimedia Content Description Interface—Part 3: Visual," ISO/IEC 15938-3/FPDAMI.

Bober et al., "Face Recognition by Fisher and Scatter Linear Discriminant Analysis," *Lecture Notes in. Computer Science* (LNCS 2756), Springer-Verlag Berlin Heidelberg, Aug. 25, 2003, pp. 638-645.

Sharbek et al., "Dual LDA for Face Recognition," *Fundamenta Informaticae*, 2004, pp. 303-334.

Spies, H., "Face Recognition in Fourier Space," *Vision Interface 2000*, 2000, pp. 38-44.

Zhao et al., "Face Recognition: A Literature Survey," *ACM Computing Surveys*, vol. 35, No. 4, Dec. 2003, pp. 399-458.

Klette et al. (eds.), Cascade of Dual LDA Operators for Face Recognition, Geometric Properties for Incomplete Data, pp. 199-219, (2006).

Klette et al., 04131 Abstracts Collection, Geometric Properties from Incomplete Data, Dagstuhl Seminar, pp. 1-13, XP007900857, (2006).

* cited by examiner

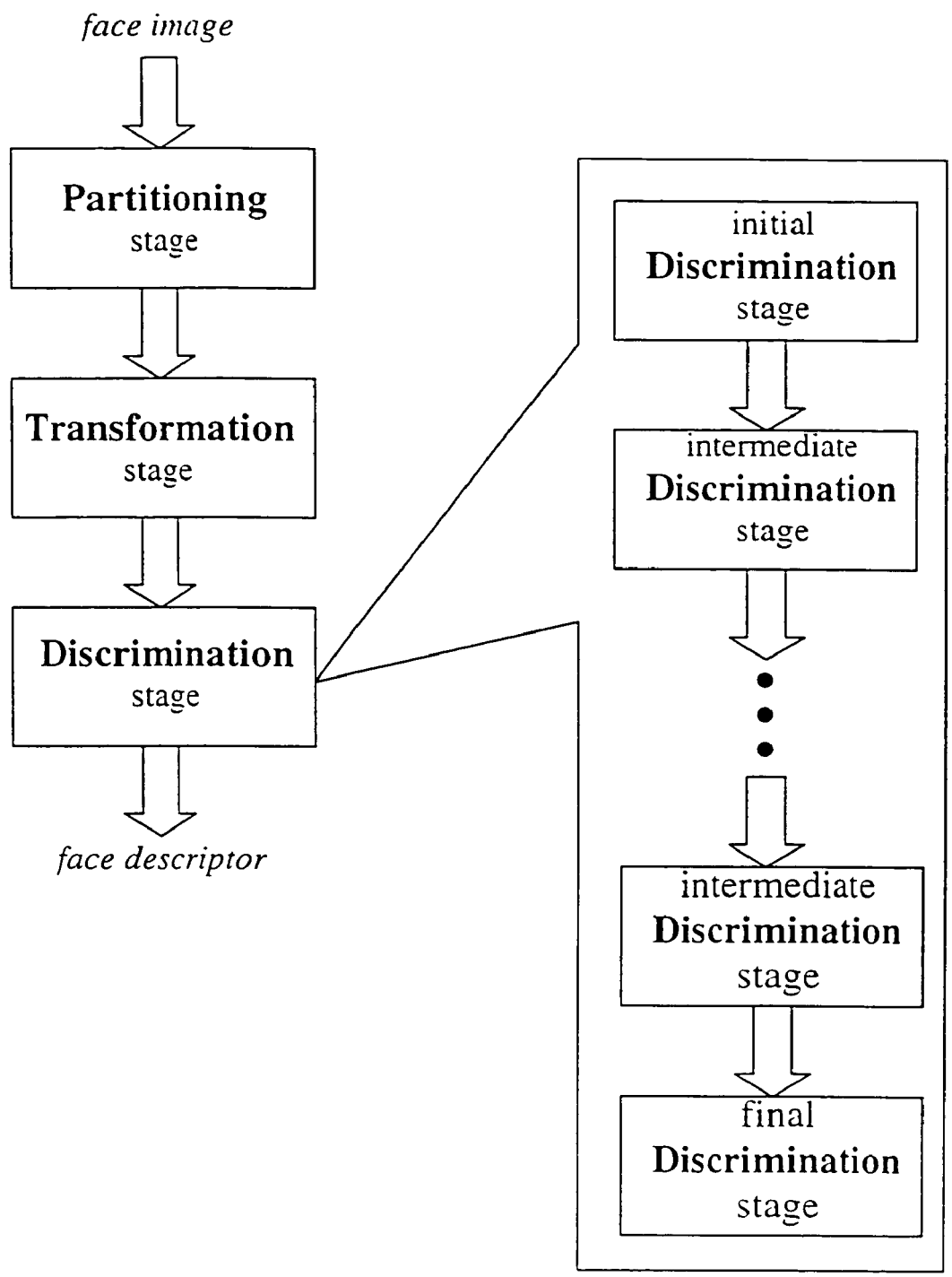
Figure 4. Multistage feature extraction

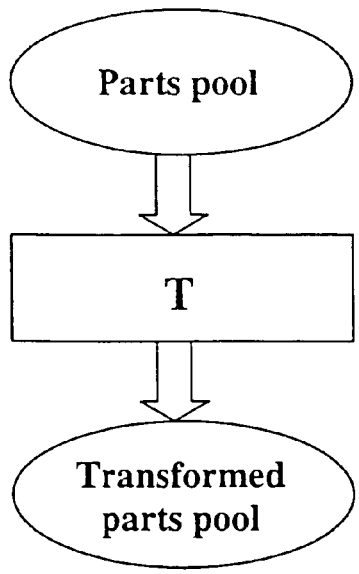
Figure 5. Transformation stage
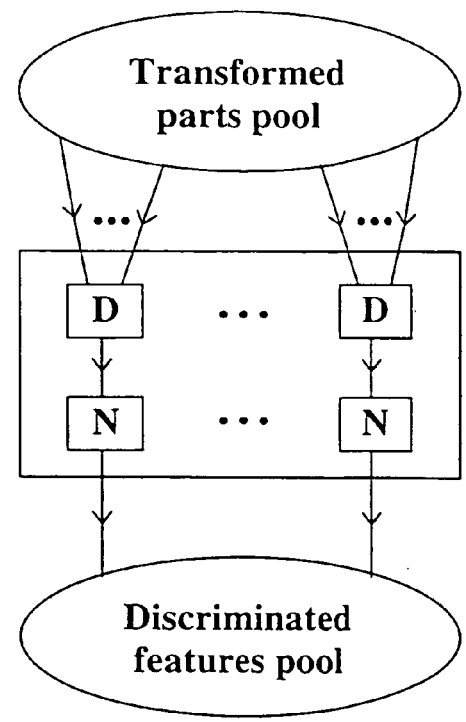
Figure 6. Initial discrimination stage
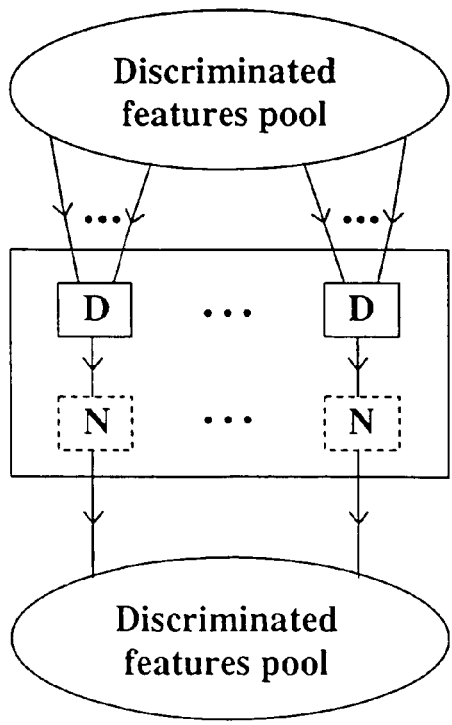
Figure 7. Intermediate discrimination stage
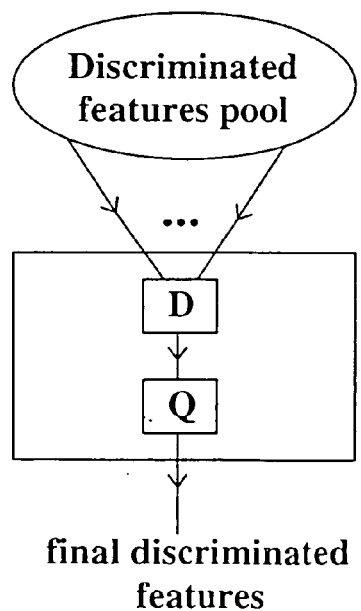
Figure 8. Final discrimination stage

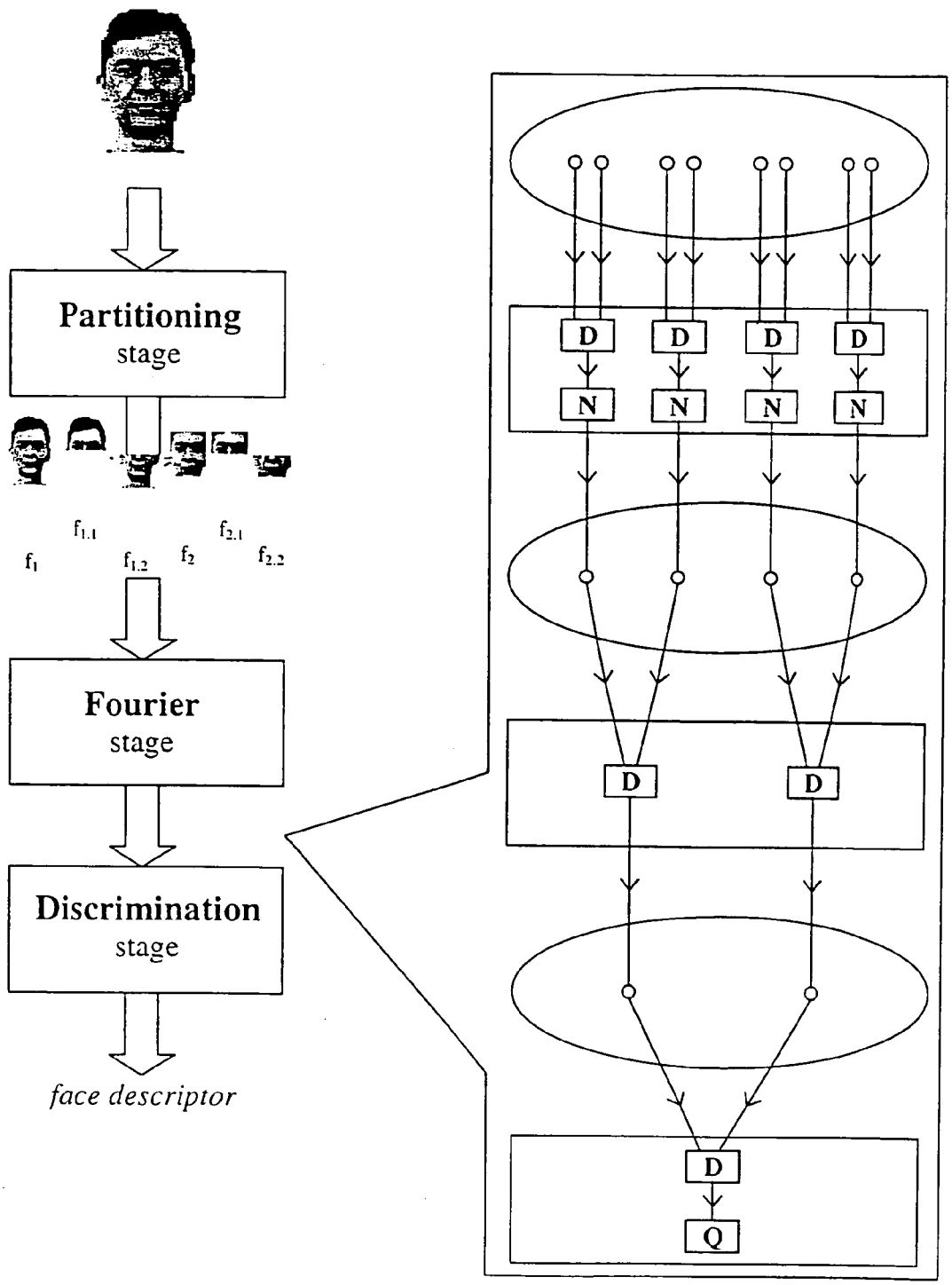
Figure 9. Exemplary multistage extraction (with 3 DLDA stages)

METHOD AND APPARATUS FOR FACE DESCRIPTION AND RECOGNITION

The invention relates to a method and apparatus for face description and recognition. The invention also relates to a method and apparatus for representing an image, especially a face in a facial image, and use of such a representation.

Possibly the first articles describing face recognition in the Fourier domain is "*Face Recognition in Fourier Space*" published in Vision Interface'2000: 38-44, Montreal, 2000. It describes a face recognition system using face description based on Fourier Spectra computed from the normalised facial image. Face verification or recognition is done by finding the closest match between feature vectors containing the Fourier coefficients at selected frequencies. A subset of 27 frequency coefficients is reported to yield good results (15 real and 12 imaginary coefficients are used). Selection of the coefficients is based on the relative variance of coefficients; the coefficients exhibiting largest variance are selected as the features. The performance of this approach is rather limited; mainly because of the simplistic way the facial features are selected, post-processed and matched.

An algorithm for Face representation using Fourier domain features, combined with image-domain features was proposed for the ISO/IEC 15938-3-AM1 Standard, and will be referred here as Advanced Face Recognition Descriptor (AFDR). The detailed description can be found in the Standard ISO/IEC 15938-3/FPDAM1, Information Technology—Multimedia Content Description Interface—Part3: Visual. Nevertheless, in the following we briefly describe the ideas behind this method to facilitate understanding of the differences between the prior art and the present invention.

The AFRD consists of the four facial feature elements:
Fourier Features
Central Fourier features
Composite Feature
Sub-region Composite Feature Since only the Fourier-based representation is relevant (corresponding to the first two feature elements above), we will describe it here in a greater detail, based on the FIG. 1.

The feature extraction in the Fourier domain employed by the AFR method consists of the following steps:

1) Division of the normalised face image $f$ into 4 and 16 regular component images (so-called multi-block images $f_1^0$, $f_1^1, \ldots f_4^1, f_1^2, \ldots, f_{16}^2$)

2) Extraction of Fourier Spectrum (i.e. real and imaginary Fourier coefficients) from the normalised face image $f$ and scanning into a Fourier Spectrum Vector $x_1^f$ (STEP 1)

3) Extraction of the Amplitude of Fourier coefficients from the clipped normalised face image $f_1^0$ and the multi-block images $f_1^1, \ldots f_4^1, f_1^2, \ldots, f_{16}^2$ and scanning into Multi-block Fourier Amplitude Vector $x_2^f$ 4) Projection of the Fourier Spectrum Vector $x_1^f$ computed in 2) using PC-LDA mapping $\Psi_1^f$, followed by a vector normalisation to unit vector $y_1^f$ 5) Projections of the Multi-block Fourier Amplitude Vector $x_2^f$ computed from the multi-block images in 3) using PC-LDA mapping $\Psi_2^f$, followed by a vector normalisation to unit vector $y_2^f$ 6) Combining (joining) of the feature vectors $y_1^f$, $y_2^f$ obtained in 4 and 5 and computing an LDA projection $\Psi_3^f$ on the joined feature vector 7) Quantisation of the feature vector The above procedure is applied to the entire normalised facial image and to the central part of the facial image, and the Fourier Feature and Central Fourier Feature simply concatenated together into a single feature vector.

The AFDR approach has several limitations. Firstly it is a very complex scheme, mainly due to need to perform multiple Fourier Transforms (specifically 44 transforms have to be computed). Secondly, the performance of the AFDR, while superior to the other prior art, is still not adequate for some applications. It is the object of the present invention to reduce the complexity of the feature extraction and matching while maintaining or improving the overall performance.

EP1411459 discloses a method and apparatus for extracting feature vectors for face recognition and retrieval. Several feature vectors are extracted and combined, namely:

1) Fourier feature vector (composed of the Fourier spectrum and Multi-block Fourier amplitudes) is generated for an entire face area. The Fourier spectrum component is generated by performing Fourier transform on the entire image. The Multi-block Fourier amplitudes are computed by performing the Fourier Transform on the entire image, and 20 sub-images obtained by dividing the entire image into 4 and 16 regular blocks. The amplitudes of the Fourier coefficients are then combined using a PC-LDA mapping.

2) Central Fourier feature vector (composed of the Fourier spectrum and amplitudes) is generated in a similar way to Fourier Feature vector but from the central face area.

3) An entire intensity feature vector is generated for the entire face area,

4) A local intensity feature vector is generated for a predetermined number of face component-wise areas.

5) An entire composite feature vector is generated by coupling the first and the second normalised vectors and the intensity feature, and a central composite feature vector is generated by coupling the third and fourth normalised vectors and the local intensity feature vectors.

US patent application 0030169908 describes a method and apparatus for recognizing and searching for a face using 2nd-order independent component analysis (ICA) or Principal Component Analysis (PCA), which is claimed to improve recognition performance in various illumination conditions. According to the method and apparatus, use of pose or illumination invariant face descriptor enables retrieval of human faces and authentication of a specific individual.

US patent application 0030165260 describes a method and apparatus for recognizing and searching for a face using 2nd-order independent component analysis (ICA). The method works by performing PCA on an input original image and generating a low-pass filtered image by removing high-frequency component from the original image, subtracting the low-pass filtered image from the original image and obtaining residual image having only high frequency-components. Another ICA is performed on the residual image generating feature information corresponding to the original image. As the first ICA transform subtracts independent components (i.e., independent basis components) from grey-scale images, the proposed 2nd-order ICA is robust to illumination variation since it is applied to make the remaining images correspond to high pass frequency components.

US patent application 0030215115 proposes a face recognition apparatus and method in which a facial image is divided into facial component images. The apparatus includes a component division unit that divides an input facial image into a plurality of facial component images; a face descriptor generating unit that generates face descriptors using a transform matrix corresponding to the respective facial component images, the face descriptors being characteristic vectors; a registered face descriptor database (DB) that stores registered face descriptors; and an authentication unit that authenticates the input facial image by comparing face descriptors for the input facial image input from the face descriptor generating unit with the registered face descriptors and providing predetermined weights corresponding to each facial component to the comparison results of each facial component.

US Patent Application 0040073543 describes an image retrieval method and apparatus using iterative matching. Such iterative matching may be applied to face recognition system based on any method. The method comprises: (a) extracting K similar images in order of matching rank by retrieving N reference images stored in an image database through comparison between a query image selected by a user and the reference images; and (b) performing iterative matching for M similar images, which are ranked higher and selected from the K similar images, with a predetermined frequency, and rearranging the matching ranks of the M similar images. According to the method and apparatus, among similar images retrieved by using a query image selected by a user, M similar images that are ranked higher are selected, and by performing iterative matching for the M similar images using the high-ranked similar image, M similar images are rearranged in order of similarity and output. Accordingly, accuracy of the matching can improve greatly and a load to the retrieval engine due to iterative retrieval can be minimized.

As mentioned previously the AFR descriptor is very complex to extract, even when only the Four-domain features (Fourier part) of the descriptor is used. The method proposed here uses a simplified Fourier domain approach with improved performance.

Aspects of the invention are set out in the accompanying claims.

In more detail, certain aspects of the invention are:

1) Use of a multi-stage architecture with three transformation stages in the Fourier Domain with the Entire and Central Features joined and mapped via D-LDA projection. (In the prior art Joint Fourier Vector and Central Fourier Vector are combined without mapping)

2) New set of component facial images which is simplified compared to AFRD and yields better performance 3) Used of a better suited linear mapping called dual-space LDA as opposed to PCA-LDA transform used in the AFRD 4) Use of different frequency components in the Fourier spectrum. In addition to low-horizontal and low-vertical frequency components used by both the AFRD and the invention, the AFRD is also scanning high-horizontal and low-vertical components, while the proposed invention uses low-horizontal and high-vertical components. As a consequence, the proposed invention is more sensitive to vertical facial features, which have superior inter-personal discriminating power and less sensitive to face localisation errors in horizontal direction.

Another aspect of the invention provides a face recognition method, apparatus and system using an architecture comprising multi-stage combination of the dual-space Linear Discriminant Analysis (D-LDA) applied to coefficients of a frequency-based transformation applied to the facial image and its components.

This new method significantly reduces extraction complexity compared to prior art and also offers increased robustness to face pose, illumination conditions and other factors, thus improving the recognition or authentication performance.

Embodiments of the invention are described below with reference to the accompanying drawings of which:

FIGS. 4-9 are block diagrams illustrating feature extraction using a multistage D-LDA architecture according to an embodiment of the invention;

FIG. 4 shows the overall scheme of the multistage feature extraction used in the preferred embodiment whereas its specific stages are presented in the subsequent figures:

FIG. 5 shows the transformation stage,

FIG. 6 shows the initial discrimination stage with blocks of normalisation,

FIG. 7 showing the intermediate discrimination stage with optional blocks of normalisation, FIG. 8 showing the final discrimination stage.

FIG. 9 shows the preferred embodiment architecture of the feature extraction with three stages of discrimination of the preferred embodiments.

Figure 10:
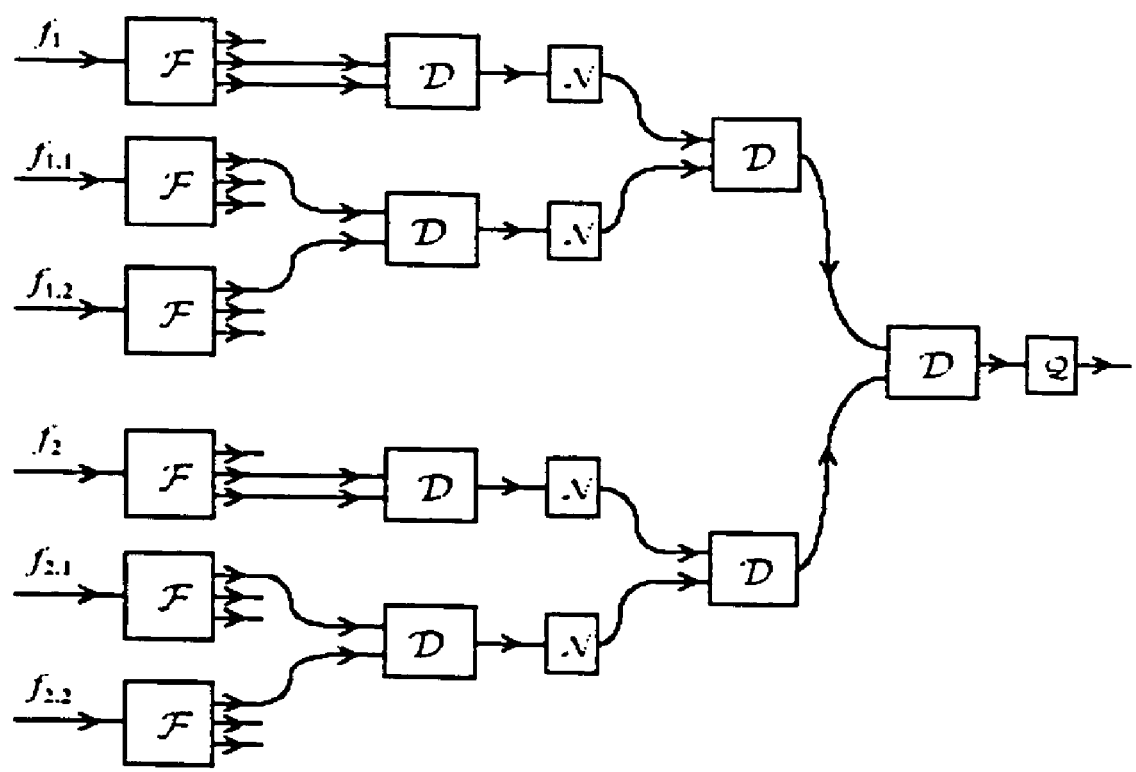

FIG. 10 illustrates more specifically the architecture of the preferred embodiment.

Figure 1:
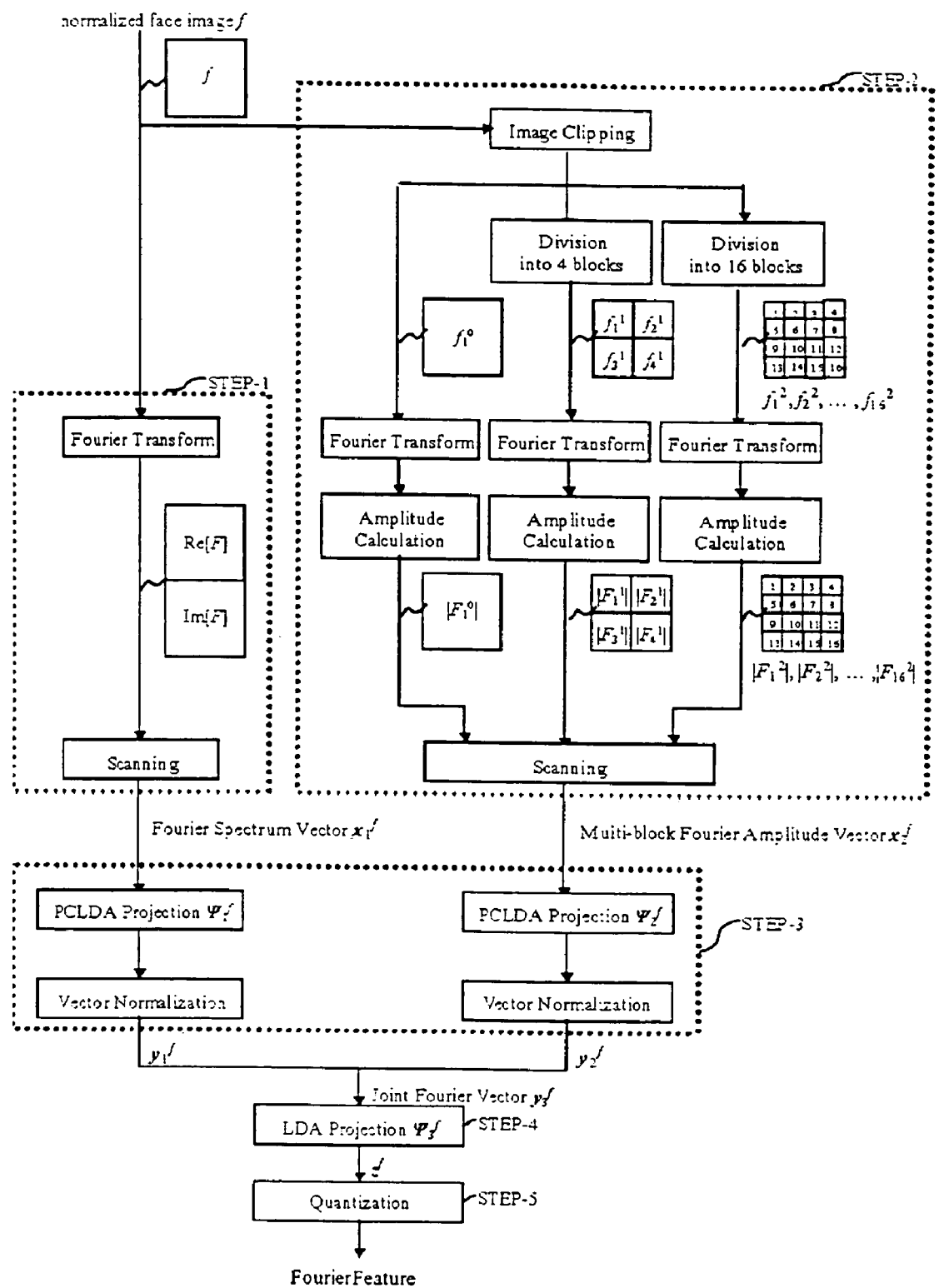
FIG. 1 is a block diagram illustrating feature extraction in the Fourier domain employed in the AFR descriptor of the prior art.
Figure 2:
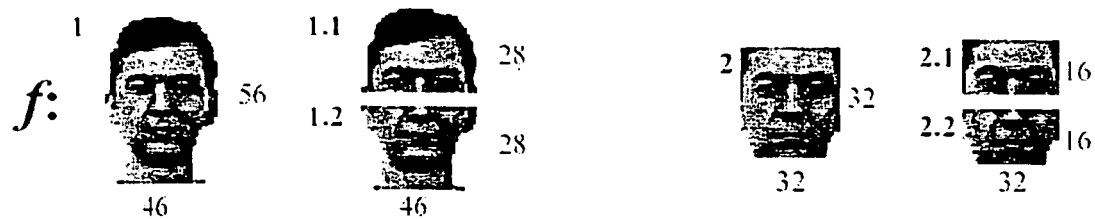
FIG. 2 shows facial components used in the preferred embodiment.

The block-symbols used in the figures are explained in the Table 1. The basic components are: Fourier Transform (T, F), feature vector transformation (discrimination transformation) (D) in the form of Linear Mapping (specifically Dual-LDA), Normalisation (N) and Quantisation (Q). As can be seen from the architecture block diagram, there are only 6 input images: $f_1, f_{1,1}, f_{1,2}, f_2, f_{2,1}, f_{2,2}$, contrasting with 42 images used for feature extraction in the AFR Fourier domain part. The images used in the preferred embodiment are shown in FIG. 2 and explained later in the text. Please note that the proposed scheme employs 3-stage discrimination architecture, with Fourier facial features extracted from the Entire and Central Image areas combined in the Final Stage DLDA mapping.

Although normalisation is shown only in the initial discrimination stage (FIG. 9), it can also be carried out in the subsequent discrimination stages.

TABLE 1

Block Symbols

| Symbol | Description |
|---|---|
| 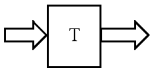 T | Transformation block element, which represents image part transformation, e.g. DCT or Fourier transformation. In case of the Fourier Transform of the input image part $f_i$, |
| 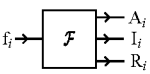 $f_i \rightarrow \mathcal{F} \rightarrow \begin{array}{c}A_i\\I_i\\R_i\end{array}$ | $A_i$ - Amplitude of the Discrete Fourier Transform<br>$R_i$ - Real Part of the Discrete Fourier Transform<br>$I_i$ - Imaginary Part of the Discrete Fourier Transform |
| 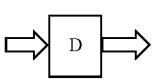 $g \rightarrow \mathcal{D} \rightarrow h$ | Linear Mapping from g to h, for example Dual-LDA<br>g - combined selected feature vectors from the previous stage<br>h - feature vector after D-LDA transformation |
| 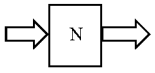 $h \rightarrow \mathcal{N} \rightarrow \tilde{h}$ | Vector Normalisation<br>$\tilde{h} = N(h) = \dfrac{h}{\|h\|}$ |
| 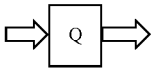 $h \rightarrow \mathcal{Q} \rightarrow h^q$<br>↑<br>k, b | Quantisation with parameters: k – threshold factor and b – number of bits per component<br>The following operations are performed:<br>Thresholding: $\tilde{x} \leftarrow \dfrac{x}{k\sigma}$<br>Clamping to values between $\lfloor -1, 1 - 2^{-2b})$<br>Level assignment |

Where FIG. 5-9 and Table 1 show the combining of feature vectors, this means concatenating the feature vectors, that is, for feature vectors (V1) (V2) the combined vector is (V1, V2).

Figure 3:
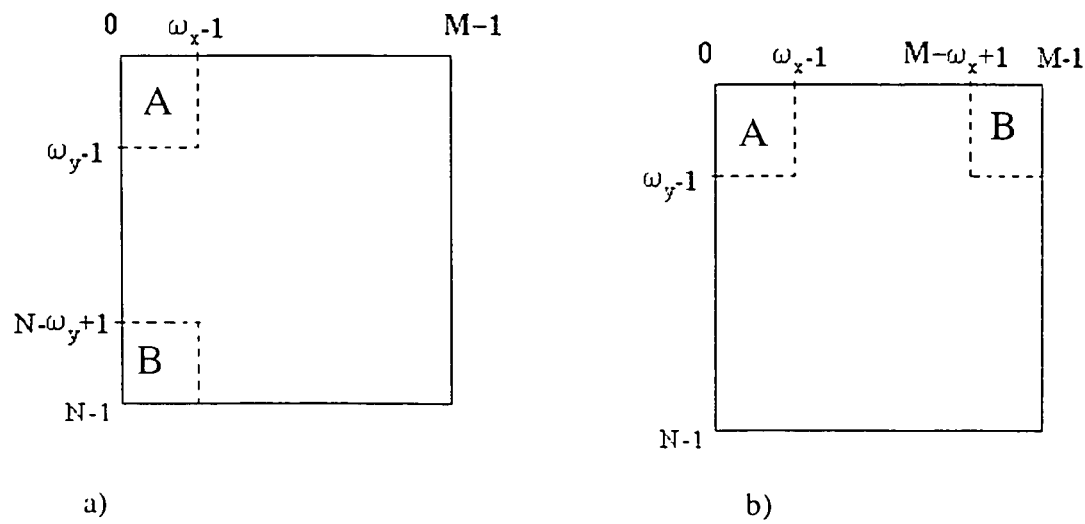
FIG. 3a shows frequency components used in the preferred embodiment.
FIG. 3b shows frequency components used by the AFRD.

Table 2 shows which components in the Fourier domain form the feature vectors which are combined, with reference to FIG. 3 which illustrates the Fourier domain for an image.

As shown in FIG. 3 and Table 2, only certain regions of the Fourier domain are used.

Further background details for implementing steps of the embodiments can be found by referring to the prior art references mentioned in the specification.

FIG. 2 shows the details of the facial components used in the preferred embodiment. As seen from the pictures, 6 component images are used: ƒ1—entire face, ƒ1.1—upper part of the facial image, ƒ1.2—lower part of the facial image, ƒ2—central part of the facial image, ƒ2.1—upper part of the central part and ƒ2.2—lower part of the facial image.

This set of facial images and components was found to give excellent results (exceeding the performance of the prior art), especially when combined with the architecture comprising 3-stages of D-LDA transformation shown in FIG. 9.

The proposed invention works with any linear mapping, obtained—for example—from LDA, PC-LDA, ICA and PCA methods, know to these skilled in the art. However, the best results are obtained by using Dual-space LDA described in M. Z. Bober, K. Kucharski and W. Skarbek "*Face Recognition by Fisher and Scatter Linear Discriminant Analysis*"; published in Lecture Notes in Computer Science, Publisher: Springer-Verlag Heidelberg, Volume 2756/2003, November 2003, pp. 638-645 ISBN: 3-540-40730-8.

A preferred embodiment implementation of the Dual-space LDA algorithm is summarised by the following pseudo-code:

DLDA Algorithm:

INPUT: Data matrix $X=[x_1, \ldots, x_L]$; $x_i$ of dimension N, dimensions q, r;

class membership vector I ($I(i)=j$ iff $x_i$ extracted from class j object)

OUTPUT: Corrected q,r,

D-LDA matrix W with N rows and r columns

Steps:

1. Compute the grand mean c and class centroids $c_1, \ldots, c_J$

2. Normalize data and centroids to Y and D, respectively:
   a. If $I(i)=j$ then $y_i:=(x_i-c_j)/\sqrt{L_j}$ ($L_j$–the number of examples of class j), $i=1, \ldots, L, j=1, \ldots, J$
   b. $d_j:=(c_j-c)\sqrt{L_j}/\sqrt{J}$ 3. Perform approximated SVD for D getting all nonzero singular values (say $q_0$):
   a. $[U,\Lambda]:=\text{asvd}(D)$; //U has $q_0$ columns, $\Lambda$ is diagonal $q_0$ by $q_0$ matrix
   b. $\Sigma:=\sqrt{\Lambda}$; //make square root for each element of $\Lambda$ 4. Correct q and select model:
   a. If $q>q_0$ then $q:=q_0$;
   b. U:=take first q columns from U;
   c. $\Sigma$:=take first q columns and q rows from $\Sigma$;

5. Compute data whitening matrix: $A:=U\Sigma^{-1}$

6. Perform whitening operation for Y: $y_i:=A^t y_i$, $i=1, \ldots, L$

7. Perform approximated SVD for Y getting all nonzero singular values (say $r_0$):
   a. $[V,\Lambda']:=\text{asvd}(Y)$; //V has $r_0$ columns, $\Lambda'$ is diagonal $r_0$ by $r_0$ matrix
   b. $\Sigma':=\sqrt{\Lambda'}$; //make square root for each element of $\Lambda'$ 8. Correct r and select model:
   a. If $r>r_0$ then $r:=r_0$;
   b. V:=take last r columns from V;

9. Return W:=AV;

The frequency coefficients (real and imaginary components and amplitudes) used for feature selection are different in the AFR method and in the present scheme. The coefficients used for feature selection in each stage are summarised in the Table 2, with reference to FIG. 3 which shows representations of the Fourier domain for an image, and in particular FIGS. 3(*a*) and 3(*b*) that illustrate where frequency components used by the preferred embodiment and the AFRD (prior art) lie. As mentioned previously, both the AFRD and the preferred embodiment of the invention use a set of coefficients representing the low-horizontal and low-vertical frequency components. However, while the AFRD is also scanning high-horizontal and low-vertical components, the proposed invention uses low-horizontal and high-vertical components giving more sensitive to vertical facial features and resulting in superior inter-personal discriminating power. Moreover, the preferred embodiment is less sensitive to face localisation errors in horizontal direction.

TABLE 2

Upper left and bottom right corners of the feature selection regions in the Fourier domain

| Image | Feature Vector | Scan region A | | Scan Region B | |
|---|---|---|---|---|---|
| $F_1$ | Imaginary and Real | (0, 0) | (9, 9) | (0, 47) | (9, 55) |
| $f_{1,1}$ | Amplitude | (0, 0) | (10, 8) | (0, 20) | (10, 27) |
| $f_{1,2}$ | Amplitude | (0, 0) | (10, 8) | (0, 20) | (10, 27) |
| $F_2$ | Imaginary and Real | (0, 0) | (5, 7) | (0, 25) | (5, 31) |
| $f_{2,1}$ | Amplitude | (0, 0) | (8, 4) | (0, 12) | (8, 15) |
| $f_{2,2}$ | Amplitude | (0, 0) | (8, 4) | (0, 12) | (8, 15) |

The similarity measure between two descriptors for face matching is computed as a weighted L2 norm of the difference between the feature vectors. Other techniques for face matching may be used, such as various matching techniques as known to the person skilled in the art.

Alternative implementations to features of the above embodiments include:

Use of a different approach to define linear mapping for each stage of the transformation (e.g. use of ICA or PCA instead of the LDA)

Use of a different facial components

Use of a different Fourier coefficients

Use of a different transformation to frequency domain (e.g. DCT transform)

In the specification, the term image means a whole image or a region of an image, except where apparent from the context. Similarly, a region of an image or component image can mean the whole image. An image includes a frame or a field, and relates to a still image or an image in a sequence of images such as a film or video, or in a related group of images.

Segmenting of an image into component images based on image content such as facial features or regions means, for example, segmenting into top and bottom halves of the face, or round an eye or nose, and not simply extracting the central face region.

The image may be a grayscale or colour image, or another type of multi-spectral image, for example, IR, UV or other electromagnetic image, or an acoustic image etc.

The invention can be implemented for example in a computer system, with suitable software and/or hardware modifications. Aspects of the invention can be provided in software and/or hardware form, or in an application-specific apparatus or application-specific modules can be provided, such as chips. Components of a system in an apparatus according to an embodiment of the invention may be provided remotely from other components. For example, the invention could be implemented in the form of a searching engine involving a database storing images and related descriptors, where queries are input remotely, for example, over the internet. The descriptors and the images to which they relate may be stored separately.

The invention can be used, for example, for determining if an image contains a face, e.g. a human face, for matching a facial image with a training set, or for matching or determining the identify of a face, for example, using different thresholds. The invention can be used in various applications such as security systems.

A skilled person in the art may also make use of this invention to match or identify other image-objects with complex varying features within a particular generalised class, adapting the technique disclosed herein such that the selected parameters best match the characteristics which determine the specific variations of features to identify a specific object within the class of objects under consideration.

The invention claimed is:

1. A method of representing an image using one or more processors to process signals corresponding to the images, the method comprising:
    segmenting, using a processor, the image into component images;
    transforming, using a processor, the component images into the frequency domain;
    deriving, using a processor, a plurality of feature vectors using the transformed component images in the frequency domain, wherein said plurality of feature vectors has a grand mean, and wherein each feature vector belongs to a class with the feature vectors in a class having a class centroid; and
    generating and outputting descriptor data representative of the image, the generation of the descriptor data comprising performing, using a processor, at least one stage of discrimination transformations using a discrimination transformation matrix generated by
        forming a first matrix from the differences between the class centroids of the plurality of feature vectors and the grand mean of the plurality of feature vectors,
        forming a second matrix from the differences between said plurality of feature vectors and their respective class centroids;
    forming a third matrix by performing a singular value decomposition of the first matrix and taking the first q left singular vectors corresponding to the q largest singular values, wherein q is a first dimension value;
        forming a fourth matrix by performing a singular value decomposition to the product of the transpose of the third matrix and the second matrix, and taking the left singular vectors corresponding to the r smallest non-zero singular values, wherein r is a second dimension value, and
        forming the product of the third matrix and the fourth matrix to generate the discrimination transformation matrix.

2. The method of claim 1 for representing a face in a facial image.

3. The method of claim 2, wherein the component images comprise or consist of a whole facial image, the top and bottom halves of the whole facial image, a central facial image, and the top and bottom halves of the central facial image.

4. The method of claim 3 comprising deriving feature vectors for imaginary and real components for the whole facial image and the central facial image, deriving feature vectors for the amplitude for the top halves of the whole facial image and the central facial image, deriving feature vectors for the amplitude for the bottom halves of the whole facial image and the central facial image.

5. The method of claim 4 wherein a first stage of transformations comprises combining and transforming (i) the real and imaginary components for the whole facial image to generate a first feature vector; (ii) the amplitudes for the top and bottom halves of the whole facial image to generate a second feature vector; (iii) the real and imaginary components for the central facial image to generate a third feature vector; and (iv) the amplitudes for the top and bottom halves of the central facial image to generate a fourth feature vector.

6. The method of claim 5 wherein a second stage of transformations comprises combining and transforming the first feature vector and the second feature vector to generate a fifth feature vector; and combining and transforming the third feature vector and the fourth feature vector to generate a sixth feature vector.

7. The method of claim 6 wherein a third stage of transformations comprises combining and transforming the fifth feature vector and the sixth feature vector to generate a seventh feature vector.

8. The method of claim 1 wherein the segmenting into component images is based on image content such as facial features or regions.

9. The method of claim 1 wherein at least one stage of transformations comprises combining feature vectors and performing transformations on the combined feature vectors to produce further feature vectors.

10. The method of claim 9 wherein each of at least three stages of discrimination transformations comprises combining feature vectors and performing transformations on the combined feature vectors.

11. The method of claim 9 wherein a stage of combining of feature vectors involves combining at least two of real components, imaginary components and amplitude of a component image, and/or combining at least two of real components, imaginary components and amplitude of different image components.

12. The method of claim 1 wherein at least one stage of transformations involves linear mappings.

13. The method of claim 12 wherein the linear mappings are based on, for example, any of principal component analysis (PCA), linear discriminant analysis (LDA), independent component analysis (ICA), PCLDA, or dual LDA.

14. The method of claim 1 wherein the transformation to the frequency domain involves a fourier transform.

15. The method of claim 14 wherein the step of deriving feature vectors for each component image comprises selecting specific predetermined Fourier coefficients.

16. The method of claim 15 comprising selecting at least low horizontal/high vertical frequency components.

17. The method of claim 1 further comprising normalisation and quantisation.

18. A method of performing face recognition or detection or classification comprising comparing descriptor data derived using a method according to claim 1 with stored descriptor data of facial images.

19. An apparatus for representing an image by descriptor data, the apparatus comprising:

means for segmenting the image into component images;
means for transforming the component images into the frequency domain;
means for deriving a plurality of feature vectors using the transformed component images in the frequency domain, wherein said plurality of feature vectors has a grand mean, and wherein each feature vector belongs to a class with the feature vectors in a class having a class centroid; and
means for generating and outputting descriptor data representative of the image, wherein for at least one stage of the discrimination transformation said generating means is operable to generate a discrimination transformation matrix by forming a first matrix from the differences between the class centroids of the plurality of feature vectors and the grand mean of the plurality of feature vectors,
forming a second matrix from the differences between said plurality of feature vectors and their respective class centroids;
forming a third matrix by performing a singular value decomposition of the first matrix and taking the first q left singular vectors corresponding to the q largest singular values, wherein q is a first dimension value;
forming a fourth matrix by performing a singular value decomposition to the product of the transpose of the third matrix and the second matrix, and taking the left singular vectors corresponding to the r smallest non-zero singular values, wherein r is a second dimension value; and
forming the product of the third matrix and the fourth matrix to generate the discrimination transformation matrix.

20. A computer-readable storage medium storing a computer program comprising computer-implementable instructions for representing an image by:

segmenting the image into component images;
transforming the component images into the frequency domain;
deriving a plurality of feature vectors using the transformed component images in the frequency domain, wherein said plurality of feature vectors has a grand mean, and wherein each feature vector belongs to a class with the feature vectors in a class having a class centroid; and
generating and outputting descriptor data representative of the image, the generation of the descriptor data comprising performing a series of at least one stage of discrimination transformations using a discrimination transformation matrix generated by forming a first matrix from the differences between the class centroids of the plurality of feature vectors and the grand mean of the plurality of feature vectors,
forming a second matrix from the differences between said plurality of feature vectors and their respective class centroids;
forming a third matrix by performing a singular value decomposition of the first matrix and taking the first q left singular vectors corresponding to the q largest singular values, wherein q is a first dimension value;
forming a fourth matrix by performing a singular value decomposition to the product of the transpose of the third matrix and the second matrix, and taking the left singular vectors corresponding to the r smallest non-zero singular values, wherein r is a second dimension value; and
forming the product of the third matrix and the fourth matrix to generate the discrimination transformation matrix.

21. A method of representing a face in a facial image by a descriptor using one or more processors to process signals corresponding to the facial image, the method comprising:

extracting, using a processor, a set of component images comprising a whole facial image, the top and bottom halves of the whole facial image, a central facial image, and the top and bottom halves of the central facial image;
transforming, using a processor, the component images into the frequency domain;

deriving, using a processor feature vectors using the transformed component images in the frequency domain, said deriving comprising deriving:
- a first feature vector using the real part of the transformed whole facial image;
- a second feature vector using the imaginary part of the transformed whole facial image;
- a third feature vector using the amplitude components for the transformed top half of the whole facial image;
- a fourth feature vector using the amplitude components for the transformed bottom half of the whole facial image;
- a fifth feature vector using the real part of the transformed central facial image;
- a sixth feature vector using the imaginary part of the central facial image;
- a seventh feature vector using the amplitude components for the transformed top half of the central facial image; and
- an eighth feature vector using the amplitude components for the transformed bottom half of the central facial image; and processing, using a processor, the feature vectors to generate a descriptor representative of the image, said processing comprising:
- a first stage comprising combining and performing a linear discrimination transformation on (i) the first and second feature vectors to generate a ninth feature vector; (ii) the third and fourth feature vectors to generate a tenth feature vector; (iii) the fifth and sixth feature vectors to generate an eleventh feature vector and (iv) the seventh and eighth feature vectors to generate a twelfth feature vector;
- a second stage comprising combining and performing a linear discrimination transformation on (v) the ninth and tenth feature vector to generate a thirteenth feature vector; and (vi) the eleventh and twelfth feature vector to generate a fourteenth feature vector; and
- a third stage comprises combining and performing a linear discrimination transformation on thirteenth and fourteenth feature vector to generate a fifteenth feature vector.

* * * * *